(12) United States Patent
Akkanen (10) Patent No.: US 10,609,136 B2
(45) Date of Patent: *Mar. 31, 2020

(54) CONTINUOUS SCHEDULING FOR PEER-TO-PEER STREAMING

(71) Applicant: Conversant Wireless Licensing S.a r.l., Luxembourg (LU)

(72) Inventor: Jyrki Akkanen, Espoo (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,872

(22) Filed: Sep. 13, 2017

(65) Prior Publication Data

US 2018/0091587 A1 Mar. 29, 2018

Related U.S. Application Data

(63) Continuation of application No. 11/963,968, filed on Dec. 24, 2007, now Pat. No. 9,769,255.

(51) Int. Cl.
*H04L 29/08* (2006.01)

(52) U.S. Cl.
CPC ........ *H04L 67/104* (2013.01); *H04L 67/1046* (2013.01); *H04L 67/1068* (2013.01); *H04L 67/1074* (2013.01); *H04L 67/325* (2013.01)

(58) Field of Classification Search
CPC ............... H04L 67/104; H04L 67/1046; H04L 67/1068; H04L 67/1074; H04L 67/325
See application file for complete search history.

(56) References Cited

U.S. PATENT DOCUMENTS 7,174,385 B2   2/2007 Li
8,316,146 B2 * 11/2012 Ehn ..................... H04L 65/4084
                                                        709/217

(Continued)

FOREIGN PATENT DOCUMENTS

WO   2005/091585 A1   9/2005
WO   2007/012914 A1   2/2007
WO   2007/110865 A1   10/2007

OTHER PUBLICATIONS

Y.H. Chu et al., "Early Experience with an Internet Broadcast System Based on Overlay Multicast", in USENIX Annual Technical Conference, Jun. 2004.

(Continued)

*Primary Examiner* — Viet D Vu
(74) *Attorney, Agent, or Firm* — Conversant Wireless Licensing (57) ABSTRACT

Apparatuses and methods for distributing and/or receiving buffer content advertisements continuously to and/or from a plurality of neighboring peer apparatuses joined in a network are described. The buffer content advertisements identify the stored packets of data in a packet buffer. The continuously distributed and/or received buffer content advertisements may include incremental updates of content of the packet buffer piggybacked to every outgoing and/or incoming packet of data. The apparatus may determine packets of data advertised by a plurality of neighboring peers that the apparatus does not have in its packet buffer, and may request packets of data, of the advertised packets, from at least one of the plurality of neighboring peers. The apparatus may include a communication module to communicate buffer content advertisements continuously to the plurality of neighboring peers.

19 Claims, 7 Drawing Sheets

(56) References Cited

U.S. PATENT DOCUMENTS

| | | |
|---|---|---|
| 2006/0174160 A1 | 8/2006 | Kim |
| 2006/0212595 A1 | 9/2006 | Chen et al. |
| 2007/0127481 A1* | 6/2007 | Park .................... H04L 65/4092 370/392 |
| 2007/0183342 A1 | 8/2007 | Wong et al. |
| 2008/0098123 A1* | 4/2008 | Huang .................. H04L 67/104 709/231 |
| 2009/0164615 A1 | 6/2009 | Jyrki |
| 2010/0030909 A1* | 2/2010 | Magharei .......... H04L 29/06027 709/231 |

OTHER PUBLICATIONS

M. Castro et al., "SplitStream: high-bandwidth multicast in cooperative environments," in Proc. ACM SOSP'03, New York, USA, Oct. 2003.

V. Venkataraman et al., "ChunkySpread: Multitree unstructured peer-to-peer multicast", in Proc. The 5th International Workshop on Peer-to-Peer Systems, Feb. 2006.

Susu Xie, et al., "A measurement of a large-scale Peer-to-Peer Live Video Streaming System," icppw. p. 57, 2007 International Conference on Parallel Processing Workshops (ICPPW 2007), 2007.

D. Kostic et al., "Bullet: high bandwidth data dissemination using an overlay mesh," in Proc. ACM SOSP'03, New York, USA, Oct. 2003.

J. Liang et al., Dagstream: Locality aware and failure resilient peer-to-peer streaming. In Proceedings of S&T/SPIE Conference on Multimedia Computing and Networking (MMCN), Jan. 2006.

V. Pai et al., "Chainsaw: Eliminating Trees from Overlay Multicast," in International Workshop on Peer-to-Peer Systems, 2005.

X. Zhang et al., CoolStreaming/DONet: A Data-driven Overlay Network for Live Media Streaming. IEEE INFOCOM'05, Miami, FL, USA, Mar. 2005.

M. Zhang et al., "Large-Scale Live Media Streaming over Peer-to-Peer Networks through Global Internet," In the Proceedings of the first ACM International Workshop on Advances in Peer-to-Peer Multimedia Streaming, in conjunGtion with ACM Multimedia 2005, Nov. 2005.

M. Zhang et al., "Optimizing the Throughput of Data-Driven based Streaming in Heterogeneous Overlay Network". In the Proceedings of ACM Multimedia Modeling 2007, vol. 4351, Jan. 2007.

Y. Chen et al., Rainbow: A Locality-aware Peer-to-Peer Overlay Multicast System, Fifth International Conference on Grid and Cooperative Computing Workshops, 2006 (GCCW '06).

V. Pai et al., "Improving Robustness of Peer-to-Peer Streaming with Incentives", First Workshop on the Economics of Networked Systems. Jun. 2006.

N. Magharei et al., "PRIME: P2P receiver-driven mesh-based streaming: Design and Evaluation," Tech. Rep. CIS-TR-06-05, 2006. [Online]. Available: http://mirage.cs.uoregon.edu/pub/tr06-05.pdf.

J. Li, "PeerStreaming: A Practical Receiver-Driven Peer-to-Peer Media Streaming System," Microsoft Research TR-2004-101, Sep. 2004.

\* cited by examiner

CONTINUOUS SCHEDULING FOR PEER-TO-PEER STREAMING

CROSS-REFERENCE TO RELATED APPLICATIONS

This application is a continuation of U.S. patent application Ser. No. 11/963,968 filed on Dec. 24, 2007. The above-identified application is herein incorporated by reference in its entirety.

Aspects of the disclosure generally relate to peer-to-peer streaming of media streams to multiple receivers. In particular, aspects relate to overlay approaches for peer-to-peer streaming.

BACKGROUND

A peer-to-peer streaming system generally embodies two components for operation: topology construction and stream delivery. First, for each peer, a system finds and selects the peers that can supply the media. Secondly, the system arranges an effective way to forward the media stream from peer to peer.

A problem with current peer-to-peer streaming protocols is that creating and maintaining an efficient stream delivery topology is hard. Most systems perform well as long as conditions are relatively stable: peers do not join or leave the overlay and network conditions do not vary. However, when conditions change, current systems have difficulties.

BRIEF SUMMARY

This Summary is provided to introduce a selection of concepts in a simplified form that are further described below in the Detailed Description. This Summary is not intended to identify key features or essential features of the claimed subject matter.

Aspects relating to the distribution and receipt of packets of data between neighboring peer apparatus are described. In one example, an advertisement module of an apparatus distributes buffer content advertisements continuously to a plurality of neighboring peers joined in a network connected to the apparatus. The buffer content advertisements identify the stored packets of data in a packet buffer associated with the apparatus. The continuously distributed buffer content advertisements may include incremental updates of content of the packet buffer piggybacked to every outgoing packet of data from the apparatus. A neighborhood manager may determine when new neighboring peers join the network and manage connections to the plurality of neighboring peers. A scheduler module may determine packets of data, advertised by the plurality of neighboring peers that the apparatus does not have in the packet buffer.

According to another aspect, a communication module may receive buffer content advertisements continuously from a neighboring peer joined in a network. The buffer content advertisements identify the stored packets of data in packet buffers associated with the neighboring peer. The buffer content advertisements received continuously may include incremental updates piggybacked to every incoming packet of data. A scheduler module may determine packets of data, advertised by the plurality of neighboring peers that the apparatus does not have in the packet buffer. A communication module communicates requests for packets from the plurality of neighboring peers and communicates buffer content advertisements of the apparatus to the plurality of neighboring peers.

BRIEF DESCRIPTION OF THE DRAWINGS

Certain embodiments are illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
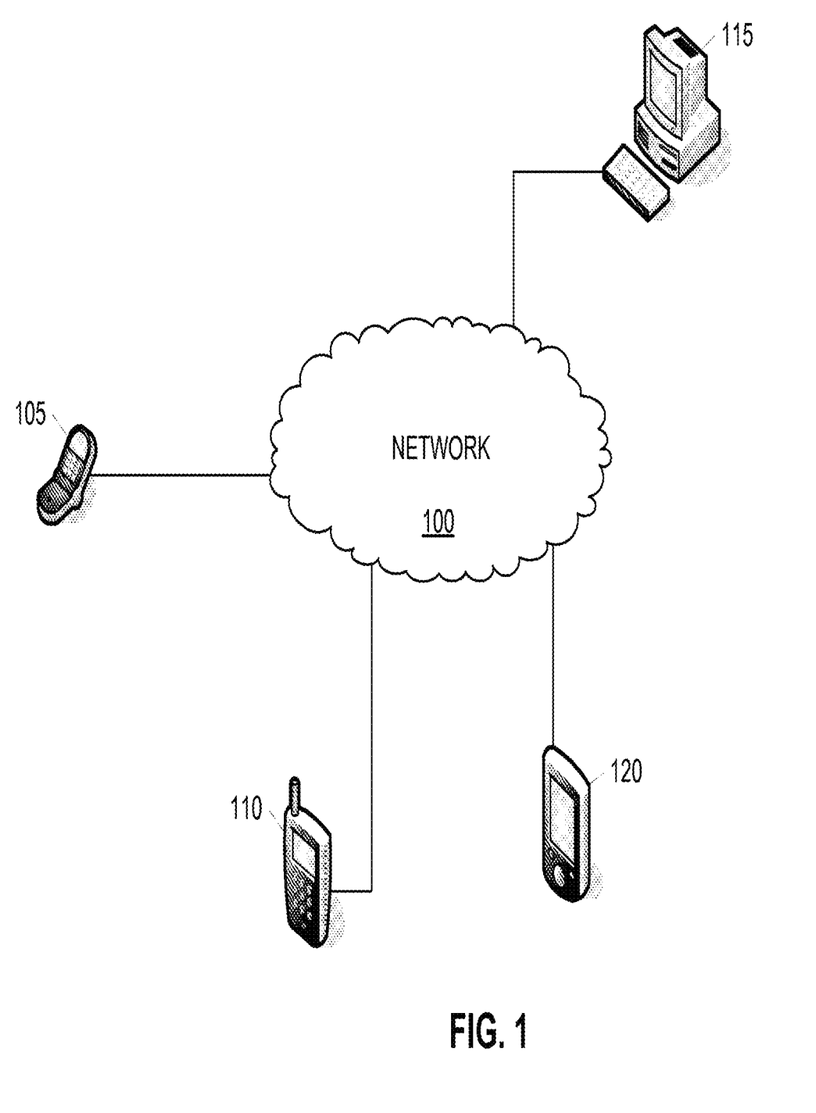
FIG. 1 illustrates a block diagram of a communication network in which one or more embodiments may be implemented.

Various embodiments may be used in a broad array of networks and communication protocols. FIG. 1 illustrates an example of a communication network through which data may be exchanged according to one or more aspects described herein. Specifically, communication network 100 includes mobile communication devices 105 and 110, personal computer (PC) 115 and personal data assistant (PDA) 120. PC, as used herein, is not limited to any particular operating system or platform. Communication through network 100 is not limited to the illustrated devices and may include other apparatuses such as a home video storage system, a portable audio/video player, a digital camera/camcorder, a positioning device such as a GPS (Global Positioning System) device or satellite, a mobile television, a STB (Set-top Box), a digital video recorder, and the like and in any combination of the aforementioned.

Devices 105, 110, 115 and 120 may be connected to each other through various types of networks. For example, mobile communication devices 105 and 110 may communicate with one another through a cellular network, a short range communication connection (such as a Bluetooth®, UWB (Ultra Wide Band), infrared, WiBree), a wireless local area network (WLAN) or a high-speed wireless data network, e.g., Evolution-Data Optimized (EV-DO) networks, Universal Mobile Telecommunications System (UMTS) networks or Enhanced Data rates for GSM Evolution (EDGE) networks. In one or more arrangements, mobile communication devices 105 and 110 and other devices like PC 115 and PDA 120 may communicate through a wired network. Further, devices 105, 110, 115 and 120 may use various communication protocols such as Internet Protocol (IP), Transmission Control Protocol (TCP), and Simple Mail Transfer Protocol (SMTP) among others known in the art.

Figure 2:
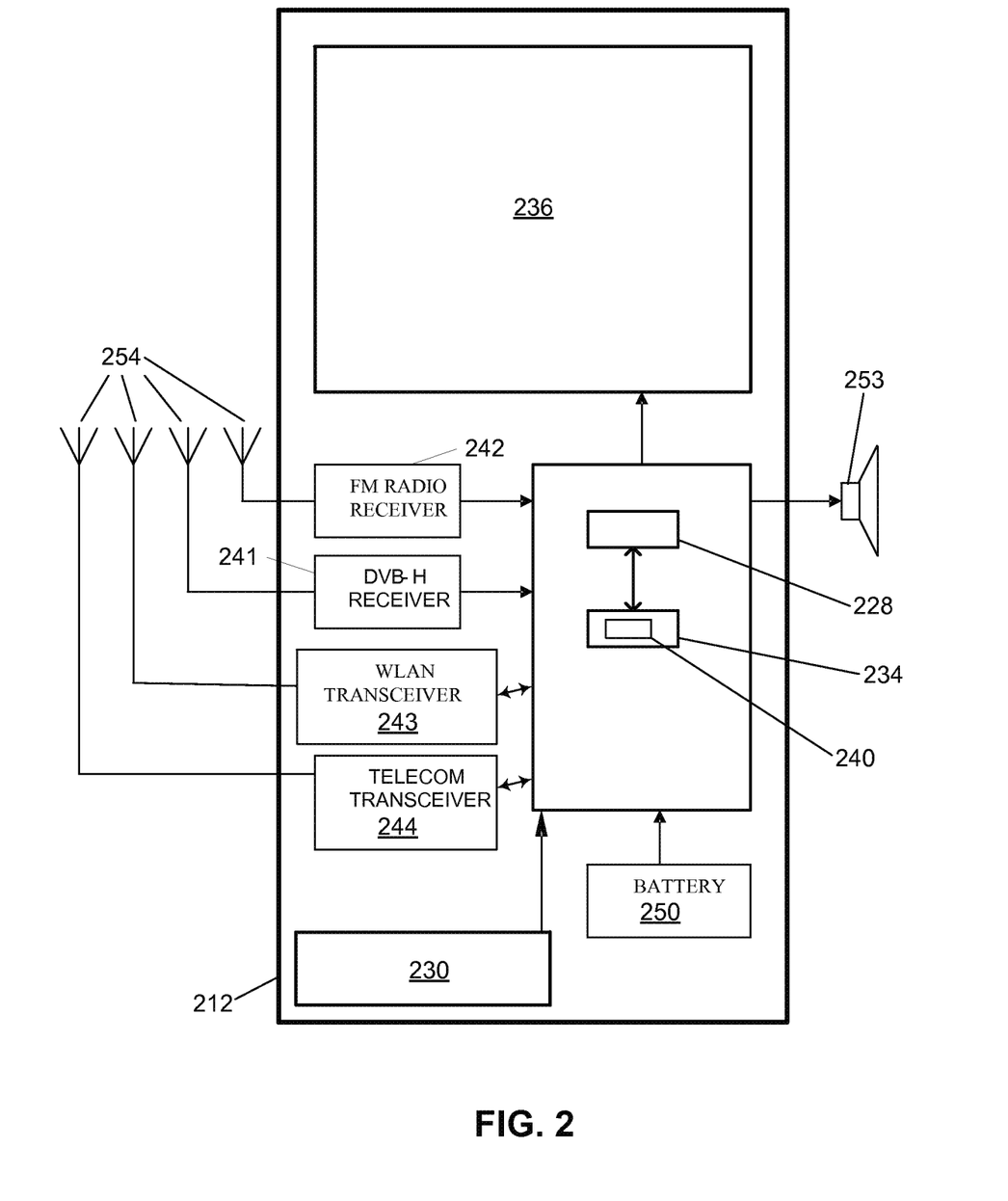
FIG. 2 illustrates a block diagram of a communication device in accordance with one or more aspects described herein.

FIG. 2 is a block diagram of a communication device such as mobile communication device 105 including processor 228 connected to user interface 230, memory 234 or other storage, and display 236. Communication device 212 may also include battery 250, speaker(s) 253, and antennas 254. User interface 230 may further include a keypad, touch screen, voice interface, one or more arrow keys, joy-stick, data glove, mouse, roller ball, and/or the like. Communication device 212 may comprise a computer, PDA, mobile telephone and/or the like.

Computer executable instructions and data used by processor 228 and other components within communication device 212 may be stored in a computer readable memory 234. The memory may be implemented with any combination of read only memory modules or random access memory modules, optionally including both volatile and nonvolatile memory. Software 240 may be stored within memory 234 or storage to provide instructions to processor 228 for enabling communication device 212 to perform various functions. Alternatively, one or more modules of communication device 212 may be embodied in hardware or firmware (not shown). Module as used herein refers either to one or more circuits configured to perform a function, or to executable instructions stored in a memory that can be executed by a processor.

Communication device 212 may be configured to receive, decode and process digital radio or television broadcast transmissions that are based, for example, on the DVB (Digital Video Broadcasting) standards, through a specific DVB receiver 241. The mobile device may also be provided with other types of receivers for digital broadcast transmissions, such as ATSC (Advanced Television Systems Committee), MediaFLO, DMB (Digital Multimedia Broadcasting), ISDB (Integrated Services Digital Broadcasting), HDTV (High-definition television), DAB (Digital Audio Broadcasting), DRM (Digital Radio Mondiale), etc. Additionally, communication device 212 may also be configured to receive, decode, and process transmissions through FM/AM Radio receiver 242, WLAN transceiver 243, and wireless telecommunications transceiver 244. Transceivers 243 and 244 may, alternatively, be separated into individual transmitter and receiver components (not shown). In one example, transceiver 244 may include a broadcast receiver (not shown) and a backward channel receiver (not shown) for communicating over the broadcast channel and the backward channel, respectively.

According to one aspect, communication device 212 may receive Radio Data System (RDS) messages. Other transmission and reception systems may also be used including BLUETOOTH®, WiMAX (Worldwide Interoperability for Microwave Access), i.e., Institute of Electrical and Electronics Engineers (IEEE) 802.16 standard, or UWB (Ultra-wideband) transceivers. In one or more instances, signals may be transmitted to and received from another mobile terminal (not shown). For example, audio, video, and other signals may be transmitted between two communication devices using various transmissions protocols such as wireless local area networks (WLANs), General Packet Radio Service (GPRS), third generation mobile system technology (3G), Bluetooth and/or Universal Plug and Play (UPnP). Such networks may be used to access or support local networks or remote networks such as the Internet.

Peer-to-peer streaming is a method to distribute media streams (e.g., voice and/or video) to multiple receivers. The approach is to let all network peers contribute in stream forwarding, i.e., in addition to receiving the stream, the stream viewers also forward it to other peers. Currently there are several approaches for peer-to-peer streaming. Four common approach categories include an application-level multicast tree approach, a multi-tree approach, a mesh-based approach, and a data driven approach.

In an application-level multicast tree approach, e.g., overlay multicast, each peer forwards the media stream, as it is, to a few other peers in such a way that the peers form a tree topology. The approach is known to work in practice but scales weakly for many reasons. The leaf peers cannot contribute, and interior peers must support relatively large output bandwidth. Furthermore, tree breakages must be repaired.

Multi-tree approaches, e.g., SplitStream, a multi-tree-based streaming algorithm developed by Microsoft Research, ChunkySpread, a multi-tree-based streaming protocol developed in Cornell University, Ithaca, N.Y., and CoolStreaming, a multi-tree based streaming algorithm developed in Roxbeam Corp., split the stream in multiple substreams, typically 4-8, and use several parallel trees to multicast the substreams. In a multi-tree approach, each peer needs to join every tree, or an adequate number of trees, in order to receive all, or an adequate number of, the substreams in order to re-generate the original stream.

Mesh-based approaches, e.g., Bullet, a mesh-based streaming protocol developed in Duke University, and DagStream, a mesh-based streaming protocol developed in University of Illinois, Urbana-Champaign, create an explicit mesh topology. Content is typically split in multiple small pieces that are then distributed across the mesh.

Finally, a data-driven overlay approach, e.g., Chainsaw, a data-driven streaming protocol developed in Stony Brook University, and DONet/CoolStreaming, a data-driven streaming protocol developed in Hong Kong University of Technology and Science, similarly to a mesh-based approach, splits content in multiple small pieces that are then distributed across the network. The network topology is, however, very dynamic and depends on piece availability.

In the content delivery mechanism in current data-driven overlay approaches, such as ChainSaw and DONet/CoolStreaming, the media stream is split in small pieces, e.g., 1 second of media. Each peer has a buffer to store these pieces, e.g., 30-120 seconds, and it periodically, e.g., once in a second, advertises the buffer content to its neighbours. Under the current data-driven overlay approaches, all peers periodically, e.g., once a second, run a scheduling algorithm in order to determine which new pieces to next request from neighbouring peers.

Scheduling is typically done in such a way that each peer has an area of interest in the buffer where it is currently collecting pieces in more or less random order. This "swarming area" is a moving window in the content stream, and it makes it possible to actually exchange pieces. When the swarming areas of two neighbouring peers overlap and contain at least some disjoint pieces, the neighbours can both contribute pieces to each other. The actual scheduling policies of existing solutions vary. For example, the Chainsaw algorithm uses pure random scheduling, requesting random pieces from the available ones in the swarming area, while DONet improved over that by preferring rare and urgent pieces.

For joining time, even with good systems operating in favorable conditions, joining a new peer may take 10-15 seconds. In flash crowd situations, where the number of peers changes suddenly by orders of magnitude, joining times may be very long, e.g., minutes, or joining may entirely fail, such as over 25% of new users must re-try joining. Finally, many peers, even over 50%, do not contribute for one reason or another.

Data-driven streaming, due to its continuous dynamism in the manner for selecting the contributing peers, has potential to address changing conditions. However, the current approaches suffer from several problems because they operate periodically.

Due to periodic advertisements, each peer's knowledge of its neighbor's buffer status is out of date. Thus decisions made in a scheduling algorithm may be based on outdated information. Periodic advertising and scheduling implies a large "buffer lag." Buffer lag, as such, is present in all streaming solutions, whenever a peer A is sending media to a peer B, peer B inevitably lags peer A in time. The consequence is that the further away that peers are from a media source, the more they lag the media source in time. When data dissemination is controlled by periodic operations, such as advertisement and scheduling, whose period is considerably longer than communication round-trip time, the lag is the same order of magnitude as the period. For current data-driven streaming, the lag is typically a couple of seconds per hop.

One approach to address the problems of data-driven streaming is to use a push-pull mechanism introduced, e.g., in GridMedia, a data-driven streaming protocol developed in Tsinghua University, Beijing, China. GridMedia addresses the end-to-end latency problem and is essentially a hybrid of multi-tree and data-driven streaming. In addition to packetizing the stream in small pieces, the stream also is divided in substreams that consist of every Nth piece. Each peer can then obtain data from its neighbors in two possible ways. In pull mode, the peer gets content advertisements and requests packets similarly to DONet. In push mode, the peer makes a persistent request for a whole substream; the neighbor automatically pushes all the pieces belonging to the requested substream without an explicit request. Push mode implies smaller latency; however, in push mode, the solution behaves essentially like a multi-tree protocol with all the problems associated with a multi-tree protocol.

GridMedia developers also have published optimal periodic scheduling algorithms, such as Data-driven Overlay Network (DON), a periodical scheduling algorithm for data-driven streaming, developed in Tsinghua University, Beijing, China, and Data-driven Overlay Network using Layered coding (DONLE), a periodical scheduling algorithm for data-driven streaming, developed in Tsinghua University, Beijing, China, to be used with a data-driven mechanism. These are, however, theoretical works and do not actually address any of the above noted problems. Instead, these algorithms attempt to optimize the throughput of periodic scheduling.

Aspects of the present disclosure improve the content delivery mechanism in a data-driven overlay approach for peer-to-peer media streaming. The advertisement and scheduling algorithms are run continuously and not periodically.

In accordance with one or more aspects of the present disclosure, a media stream may be split into small packets, such as the size of a single, non-fragmented IP packet. Each peer may have a buffer to store a number of these packets. Peers continuously may get incremental advertisements about the buffer content of their neighbour peers and may be running the scheduling algorithm all the time. The advertisements may be fed in the scheduler, one by one, immediately when they arrive. The scheduler may output packet requests, which may be sent to neighbour peers. The neighbour peers may return packets according to the requests.

Instead of getting a buffer map advertisement, e.g., once a second by conventional periodic intervals, a peer may receive incremental updates to a neighbour buffer map piggybacked to every incoming packet, typically 30-50 times a second. In addition, instead of running a scheduling algorithm, e.g., once in a few seconds to schedule several packet requests, the algorithm may run continuously. The incoming advertisements immediately may be fed in a scheduler that maintains a plan to fetch missing pieces from neighbour peers. This plan may be updated each time a new advertisement arrives so that it is always up-to-date. Still further, instead of responding to periodical packet requests, containing request for several packets, a continuous data flow may be maintained between peers. A receiving peer continuously may pick requests from its scheduler and may send them to a contributing peer. The contributing peer continuously may send packets back to the requester. The protocol may seek to keep as few pending requests out as possible.

Figure 3:
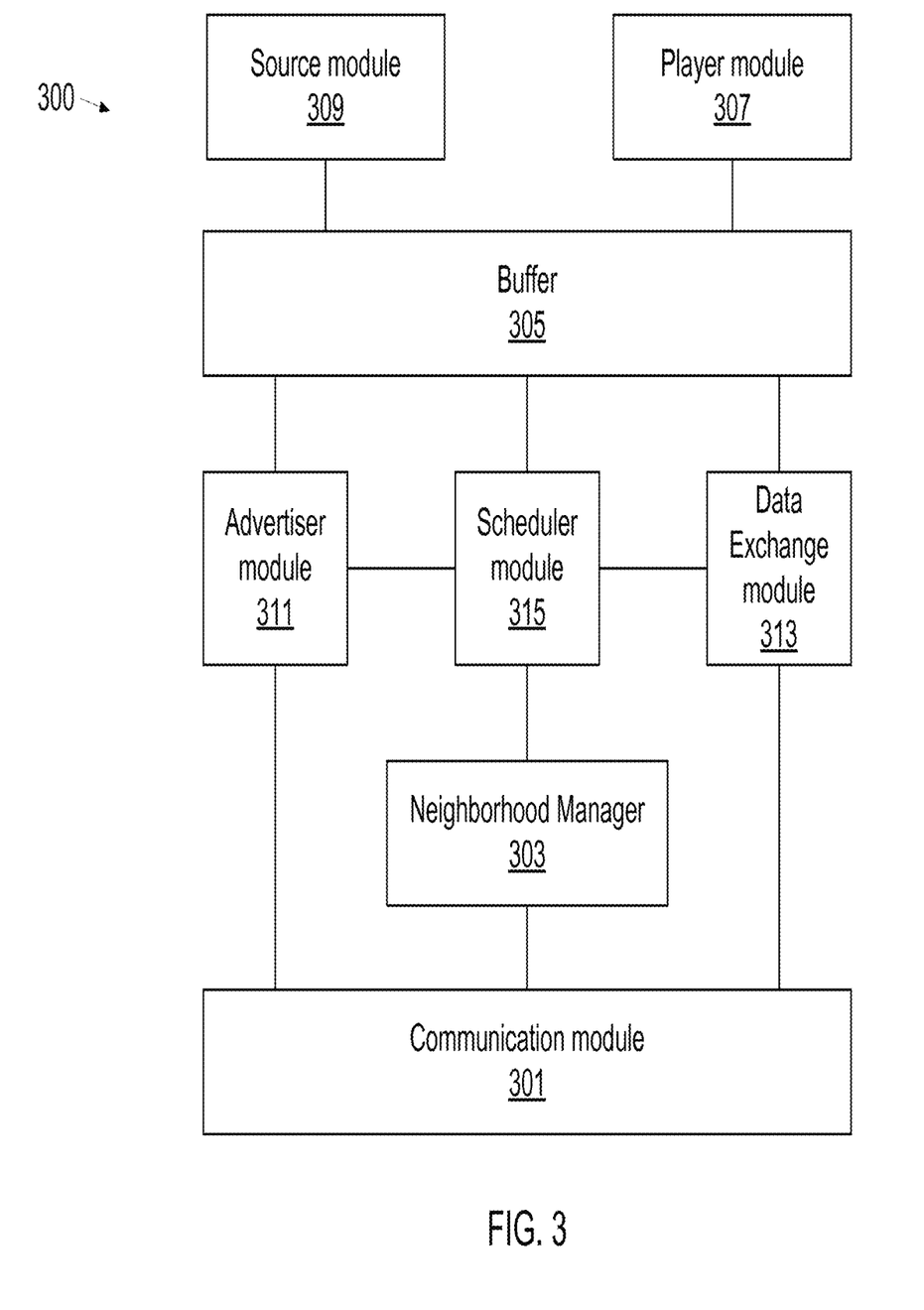
FIG. 3 illustrates a block diagram of an operational environment in accordance with one or more aspects described herein.

FIG. 3 illustrates a block diagram of an operational environment 300 in accordance with one or more aspects described herein. The system 300 in FIG. 3 is shown to include eight components. A neighbourhood manager 303 may be configured to discover other peers in a network and manage connections to them. A media buffer 305 may be configured to store media packets. An advertiser protocol module 311 may be configured to distribute buffer content advertisements to neighbour peers. A scheduler module 315 may be configured to maintain a download plan for missing packets. A data exchange protocol module 313 may be configured to request packets from neighbour peers. A media source module 309 may be configured to operate only in the source peer and may import new packets in the buffer 305. A media player module 307 may be configured to copy packets from the buffer 305 to an external media player. Below the modules is shown a communication module 301 that may be configured to pack all data in User Datagram Protocol (UDP) packets and maintain a steady data flow between neighbouring peers. Each of the different components is discussed further below.

All communication between peers occurs over a protocol. As described in these examples included, the communication between peers occurs over the User Datagram protocol (UDP); however, it should be understood by those skilled in the art that other protocols may be used in place. Communication module 301 may be configured to maintain a steady data flow to neighboring peers and may adjust the data rate constantly according to need and network capacity. For example, a known rate control protocol like TCP-Friendly Rate Control (TFRC) may be used.

The modules that desire to exchange data with peers, such as advertiser module 311, neighborhood manager 303, and data exchange module 313, may express to communication module 301 that they need to send out data. Communication module 301 then may pack the data in UDP packets and may send the packets out to neighbor peers.

Thus, for example, when advertiser module 311 desires to send an advertisement, it may inform communication module 301 about pending advertisements. Then, communication module 301 may look for the most appropriate way to send advertisements to peers without unnecessary delay by either piggybacking them to a data packet or sending them in a separate packet.

Neighborhood manager 303 may be configured to find new peers and connect to them. With respect to an actual protocol to find peers, there are several possible alternatives. A centralized tracker, a distributed tracker, based on, e.g., a Distributed Hash Table, and/or gossiping protocol may be used. Neighborhood manager 303 may be configured to maintain knowledge of a random set of other peers. This knowledge may include the transmission addresses, e.g., IP address and UDP port, of the peers and may be infrequently updated, with intervals of tens of seconds or longer.

To bootstrap, a peer first may connect to a known rendezvous point, e.g., a known host that is able to provide an initial list of peers. Such may be direct or indirect depending on the approach. Thereafter, neighborhood manager 303 may select a few peers, such as around 4-8, in random and may ask the communication module 301 to create a connection to them. These peers subsequently are called neighbors. After the connections have been set up, the other modules may initiate the streaming.

During streaming, neighborhood manager 303 may monitor the connections to neighbor peers. For monitoring, neighborhood manager 303 may receive data concerning how much data the peer contributes from scheduler module 315 and also data concerning data rate from communication module 301. Neighborhood manager 303 continuously may attempt to improve the performance, such as by dropping connections to weak peers and creating new connections to randomly selected new peers. However, neighborhood manager 303 may be configured to avoid being too aggressive.

Figure 4:
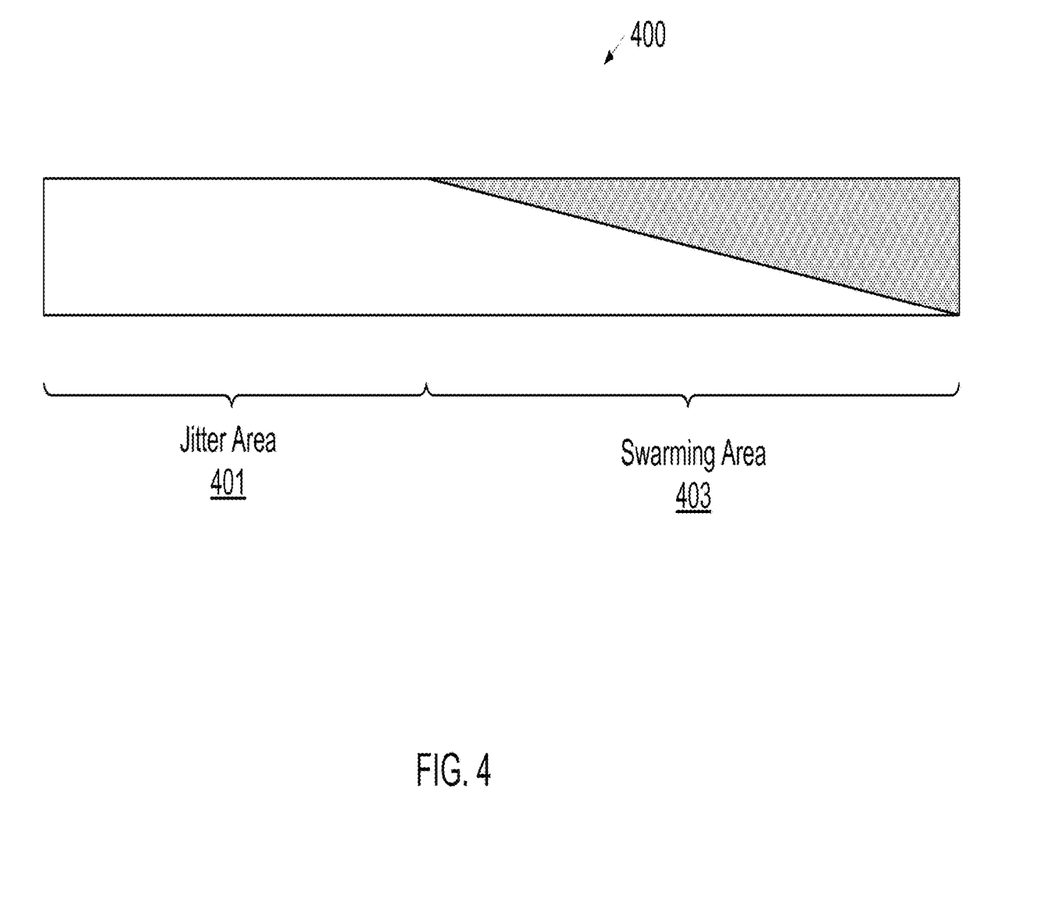
FIG. 4 illustrates an example packet buffer for storing media packets in accordance with one or more aspects described herein.

Packet buffer 305 may store media packets. In one illustrative example, the size of packet buffer 305 may be in the range of 256-512 packets, depending on the supported stream rate. Packets may be identified with sequence numbers, such as a 16-bit unsigned integer as the sequence numbers can wrap over. FIG. 4 illustrates an example packet buffer 400 for storing media packets.

Packet buffer 400 is shown divided in two areas. At the head side, a jitter area 401 is shown. Jitter area 401 is where the buffer 400 has no gaps, e.g., this area is needed to eliminate jitter for playing. Jitter area 401 is configured to act as a reserve so that there is time to handle changing conditions, i.e., switching neighbor peers. At the tail side, a swarming area 403 is shown. During swarming area 403, the peer actively may be collecting packets. The density of packets at swarming area 403 is decreasing; the further away, the fewer packets. Both areas 401 and 403 may be moving windows, and both may shift forwards in the course of time. The boundary between jitter area 401 and swarming area 403 may be dynamic. Player module 307 normally may read packets from the beginning of jitter area 401, but in unfavorable conditions, player module 403 may proceed to swarming area 403 where frame drops are possible.

In accordance with one illustrative example, media packets may carry multiple Real-Time Transport Protocol (RTP) streams so that each media packet also contains an RTP timestamp and stream ID. Saving the entire RTP header also may be an option. Packet buffer 305 also may be configured to store the stream description for the RTP streams.

Player module 307 may be configured to read packets from packet buffer 305 and send the read packets to an external media player. In accordance with one illustrative example, the external media player may access the media through a standard RTSP/RTP protocol. Player module 307 may be configured to ensure correct timing to avoid overflowing the jitter buffer of the player. In accordance with one or more aspects of the present disclosure, player module 307 may send media packets out to an external media player according to the RTP timestamps of the media packets.

Source module 309 may be configured to push new packets in to a packet buffer of the source peer 300. In accordance with one illustrative example, source module 309 receives packets from an external streaming server that, in turn, may read media, e.g., from a file, through standard RTSP/RTP protocol. In another illustrative example, source module 309 may be configured to save the stream description in packet buffer 305.

Advertiser module 311 may be configured to distribute knowledge of buffer content to neighbour peers. Advertiser module 311 may operate continuously and may keep neighbour peers up-to-date. When a new connection to a neighbour peer is created, advertiser module 311 first may send a packed image of its entire buffer map and thereafter only incremental updates may be sent. As should be understood by those skilled in the art, each module, as described herein, may comprise computer readable instructions that carry out the functions corresponding to that module.

Figure 5:
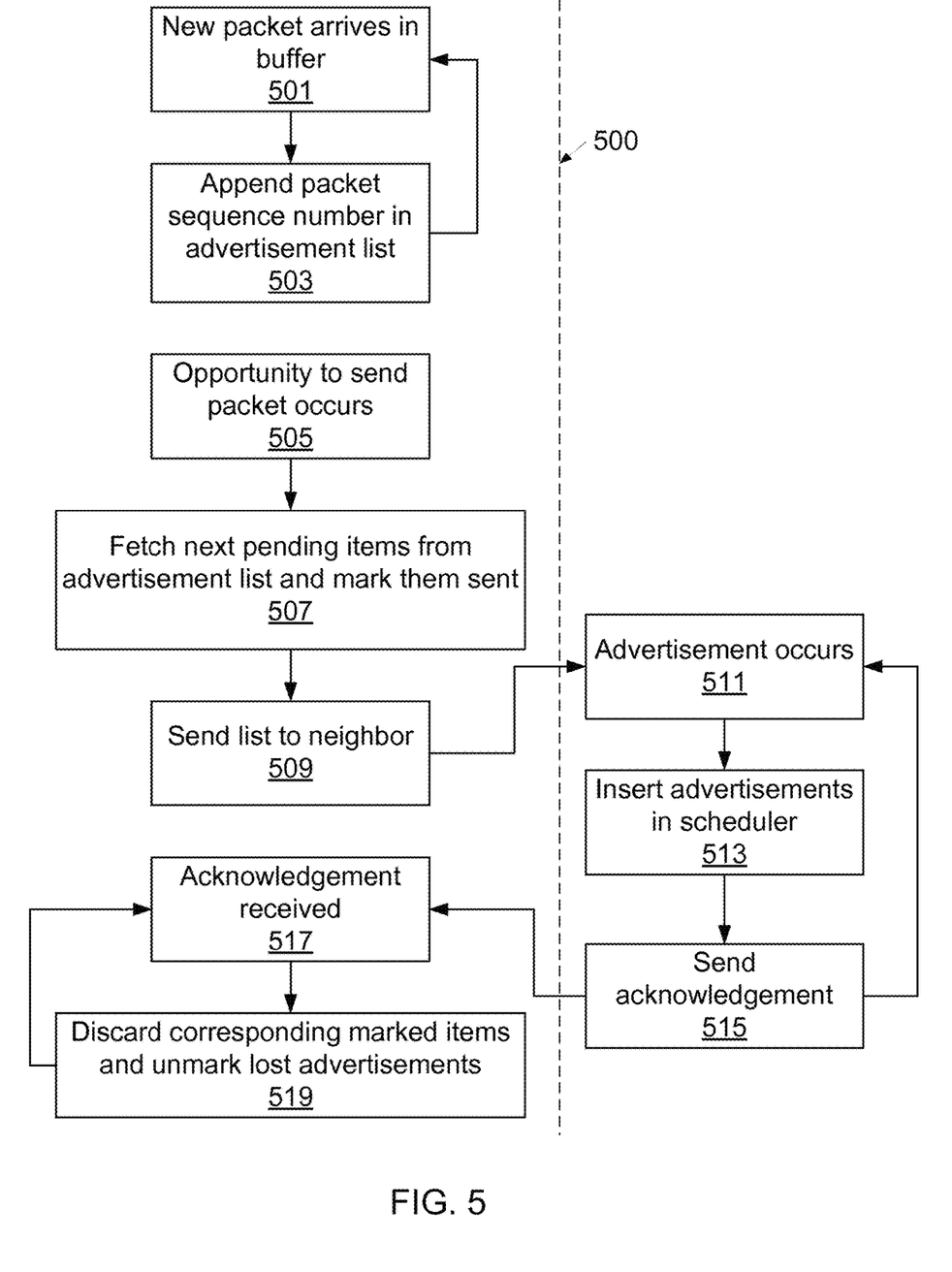
FIG. 5 is a flowchart illustrating a method for distributing knowledge of buffer content to neighbor peers in accordance with one more aspects described herein.

FIG. 5 illustrates an illustrative incremental advertisement process. To ensure reliable transmission, a retransmission scheme may be implemented. As illustrated in this example, steps on the left of the dashed line 500 occur in a sending peer, and steps on the right side of the dashed line 500 occur in a receiving peer. As shown, a sending peer first may receive all incremental modifications to buffer content in a transmission queue in step 501. This transmission queue may be an advertisement list of packet sequence numbers appended with the received packets in step 503. There may be a separate advertisement queue for every neighbour peer.

An opportunity to send a packet to a neighbour peer may occur in step 505. A communication module then may look at the transmission queue and may fetch the next pending items from the advertisement list and mark them as sent in step 507. In step 509, the communication module may send the sequence numbers in the transmission queue to the neighbour peer. As advertisements are continuously made, the advertisement list is, in normal conditions, relatively short, approximately as many packets as there are neighbours, and the entire list may be piggybacked in a data packet. In exceptional cases, the advertisement list may increase and then a communication module has an option to send a larger advertisement, in its own packet, or even send an entire buffer map. As should be understood by those skilled in the art, an advertisement may include a sequence number, data, and/or both with respect to content of a buffer of the advertising peer.

A receiving peer, the neighbour peer, may receive advertisements in step 511 and may feed the incoming advertisements to a scheduler module in step 513. The receiving peer then may send back an acknowledgement in step 515. When the sending peer receives the acknowledgement in step 517, the sending peer may discard the marked items from the transmission queue in step 519. If some packets are lost, either the advertisement or acknowledgement, the advertisement items in the queue may be unmarked and re-transmitted in step 519 also.

For normal peers, all packets in a buffer are advertised. However, to increase buffer diversity, efficient swarming suggests that the buffers of neighbours have different content, and a random fan-out algorithm may be implemented in the source peer. So, instead of advertising all packets, the source peer explicitly creates a swarming area in its advertised buffer map; in the tail side of the buffer, only randomly selected packets are advertised. The packet density in the advertised buffer follows the generic decreasing density principle as shown in FIG. 4.

To generate such density, each new packet may be advertised with probability N/(N+i), where N is a constant that determines the size of the swarming area and i is the distance of the packet from the beginning of the swarming area. Such leads to linearly decreasing density in the swarming area.

Other fan-out schemes are also possible in addition to the above described random scheme. For example, if a source node has K neighbour peers, the source node may advertise every $K^{th}$ packet to each neighbour. Random fan out gives enough diversity for efficient swarming as long as the pending number of advertised packets is small relative to the length of the swarming area.

Data exchange module 313 may be configured to exchange media stream packets between peers. The process may be receiver-driven and it may be controlled by a communication module and/or a scheduler module. As described above, a communication module, such as communication module 301, may be configured to maintain a steady data rate between neighbor peers.

The data exchange between neighbors may begin by a receiver peer sending a request to a media provider. Whenever a communication module of the receiver peer has an opportunity to send a packet to the media provider, the communication module may pick a request from a scheduler module, such as scheduler module 315. Such a request may be a sequence number of a packet. The communication module may send the request to the media provider. The request may be piggybacked to a packet, which may be a media data packet going in the opposite direction, and also it may carry advertisement or its acknowledgement.

When the media provider receives the request, the media provider sends the corresponding media packet back in the next possible opportunity. The recipient inserts the packet in its buffer, such as buffer 305, and updates its scheduler module, such as scheduler module 315. To cope with possible packet loss, the requests may be marked in the scheduler module as sent and, if the corresponding packet does not arrive, the request may be reinserted in the scheduler module. Loss detection may be based on timer and/or comparing the arriving packets to sent requests.

The communication module may control the data flow and may keep as few outstanding requests as possible. The intention is that requests are queued in a scheduler module rather than in the media provider. As long as a request is queued in a scheduler module, the scheduler module does not need to assign the request to a particular provider before it needs to be sent.

Scheduler module 315 may be configured to assign each advertised packet that the peer does not yet have to a neighbour peer that may provide the packet, and configured to arrange the requests in a suitable order. For data-driven streaming, the following criteria may be used when assigning packets. The maximum data rate from the neighbour peer may not be exceeded. Rare packets, i.e., packets available only from a few neighbour peers, may be fetched early. Urgent packets, i.e., packets whose playing time is close, may be fetched early. In accordance with one or more other embodiments, random assignment in random order may be implemented.

Figure 6:
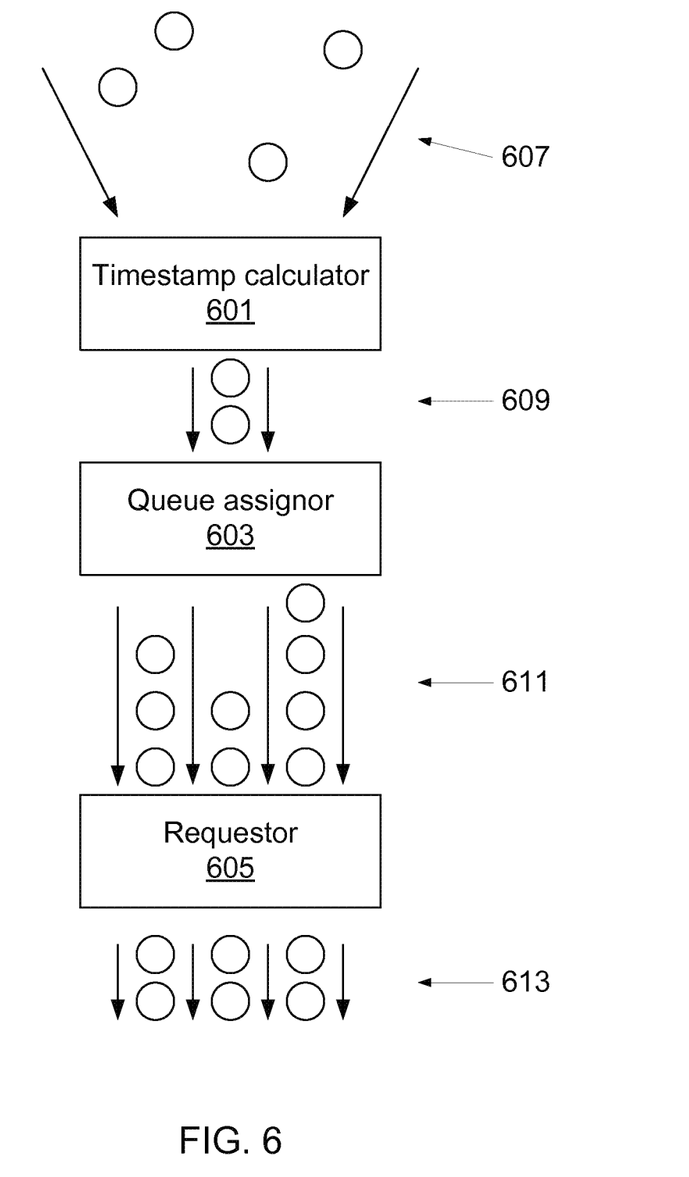
FIG. 6 is a block diagram illustrating a structure of an example scheduler module in accordance with one more aspects described herein.

Aspects of the present disclosure utilize an algorithm that allows continuous execution. FIG. 6 is a block diagram illustrating a structure of an example scheduler module in accordance with one more aspects described herein. The input to the algorithm may include packet advertisements 607 and arriving packets, and the algorithm outputs may be requests for new packets. Internally, the algorithm may maintain an assignment queue 611 for each neighbour peer. Such a queue may contain those requests that are tentatively assigned to the neighbour peer in the order the requests are to be requested. Assignments may be tentative so external events, e.g., arrival of new advertisements, change in link conditions, etc., may be allowed to change the assignment.

Advertisements 607 come from neighbour peers and are received by a scheduler module, which first may assign a virtual timestamp to each request by timestamp calculator 601. This timestamp may denote a moment in time when the packet should be requested. The timestamp may be created by adding three elements to the current time, while the current time is the timestamp of the packets being currently requested. The three elements include a rarity element that is proportional to the number of neighbours having the packet. Such may be estimated with the number of neighbours having advertised it. For rare packets, the number of neighbours having the packet is small, thus meaning an earlier time for sending the request. Another element is an urgency element that is proportional to the time when the packet is required. For urgent packets, the time when the packet is required is small, thus meaning an earlier time, and may even be negative. The third element is a random element. In this case, a random number may be added to the time value. Performing such an addition causes the requests eventually to be sorted in a random order, biased with rarity and urgency, when they are sorted according to timestamps. When requests are then sent to the provider in this order and the provider has returned packets, there is a biased random selection of packets in the swarming area, such as shown in FIG. 4. The distribution of the random numbers is not necessarily uniform. It is a parameter that may be used to fine-tune the algorithm. The requests 607 may then be ordered by virtual timestamps as shown by reference element 609. The ordered requests 609 may then be stored in an assignment queue 611. Queue assigner 603 may be configured to assign an ordered request to one of the neighbour peers as shown by reference element 611. The scheduler, in general: (1) may decide in which order/when to request each packet, handled by the timestamp calculator, and (2) may decide from whom to request the packet, handled by the queue assigner. The queue assigner may split the incoming flow of time stamped requests 609 and may store each of them to one of the queues 611. There may be one queue per neighbor. The queue assigner also may move requests from a first queue 611 to another queue 611 whenever it needs to. Only the neighbours who have advertised the packet are valid. In addition, the sustainable data rate from the neighbour, which may be obtained from a communication module, may be accounted for to avoid congested neighbour peers. In one example, it may be desired to avoid requesting too much from a neighbor. As such, the data rate from each neighbor may be limited. The communication module may maintain an estimate of the maximum data rate from the neighbor, e.g., packets per sec. By knowing it, a scheduler may estimate how fast each queue proceeds. With this element, a queue assigner knows how "full" each queue is. The requests that are not sent may be stored in queues 611. In this context, with respect to the internals of a scheduler, requester 605 is the entity wanting a request every now and then. There may be many requestors. Concretely, the requester may be the data exchange module 313 asking for the next request to a neighbor. A data exchange module may work in close co-operation with a communication module. A data exchange module may know at which rate media packets may be sent and received. It may determine the rate at which requests are sent to each neighbor. A communication module may determine the exact moments of time when UDP packets are transmitted and what is packed in them. The lists 613 below the requester are storages for the pending requests. These are discarded when packets arrive or are re-fed in the scheduler if packet is lost. If a packet is rare, the few valid queues may be congested. In such an occurrence, other assignments may be moved to other queues.

Figure 7:
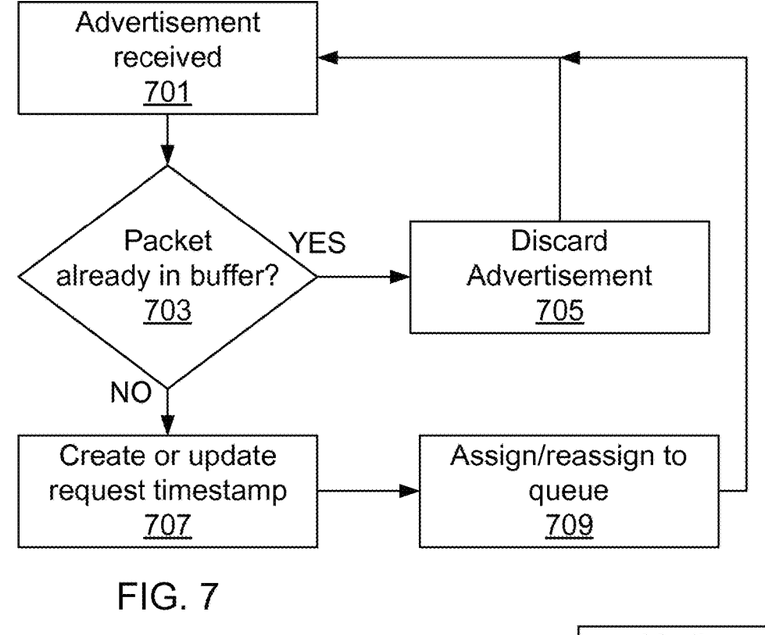
FIG. 7 is a flowchart illustrating a method for managing advertisement arrivals in accordance with one more aspects described herein.

FIG. 7 is a flowchart illustrating a method for managing advertisement arrivals in accordance with one more aspects. When a new advertisement arrives at a peer in step 701, the process moves to step 703 where a determination is made as to whether a scheduler module of the peer already has the packet in its buffer, such as buffer 305. If yes, the process moves to step 705 where the advertisement may be discarded. If no and the scheduler module already has a request for the packet, if a tentative request exists, the tentative request may be updated, e.g., its rarity element may change in step 707, and the tentative request may be reassigned, e.g., moved to a different queue, in step 709. In another illustrative example, a new tentative request may be created, given a timestamp, and assigned to a queue.

Figure 8:
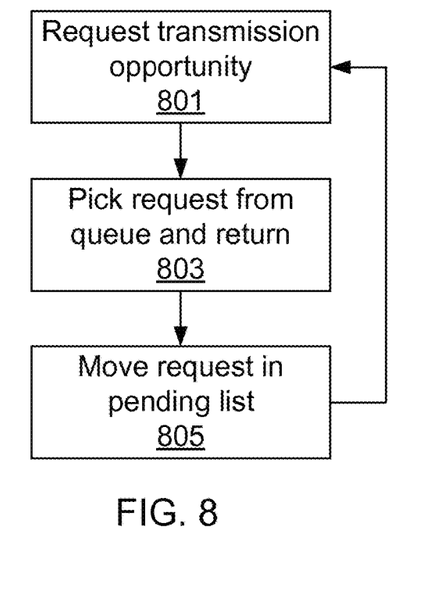
FIG. 8 is a flowchart illustrating a method for managing requests in accordance with one more aspects described herein.

FIG. 8 is a flowchart illustrating a method for managing requests in accordance with one more aspects, for how a requester, such as requester 605, e.g., a data exchange module, picks a request from a scheduler. A data exchange module may decide that it is time to create a new request to a neighbor A and a communication module may agree that it is able to send it out. Such may be referred to as a "request poll" 801. Upon this poll, the requester picks at step 803, a request from the head of the queue 611 of neighbor A and moves at step 805, it in the list 613 of pending requests from neighbor A. If the queue 611 of neighbor A is empty, the requester also may search for a request from some other queue. This may not lead to reassignments except in cases where the assignment queue is empty. In such an example, a request may be searched from other queues. The sent requests may be marked as sent and retained in a separate list as in step 805. An advertiser may have a separate and independent process. For example, a source peer may run an advertiser, such as in a fan-out mode, but may not run a scheduler, as it gets all the packets from a source. The other peers may run both.

Figure 9:
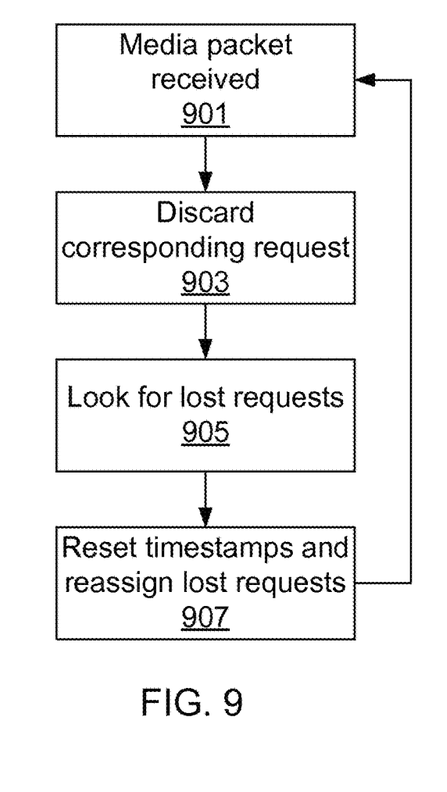
FIG. 9 is a flowchart illustrating a method for managing media packet arrivals in accordance with one more aspects described herein.

FIG. 9 is a flowchart illustrating a method for managing media packet arrivals in accordance with one more aspects. When a media packet is received at the scheduler module in step 901, the scheduler module may be checked for the corresponding request that is usually in the list of sent requests 613 but may also be found in assignment queues 611 if a retransmission operation has taken place. The corresponding request then may be discarded in step 903. If the packet was in the list of sent requests, suitable heuristics may be run to detect possible lost requests/packets in step 905. Loss detection alternatives include a retransmission timer. A scheduler estimates a deadline for the packet arrival and saves this in each sent request. Another alternative is a request/return pattern matching. A scheduler remembers the order in which requests were made and assumes that packets will be returned in the same order. A missing packet from the input flow is interpreted as loss. Still another alternative is a more complicated pattern matching to support minor re-ordering of the packets. A receiver maintains a moving window for the few (3-8) next expected packets that may arrive in any order. The window moves forwards whenever its first packet arrives. Arrival beyond the window triggers loss. The main practical difference between these is the tradeoff between fast loss detection and false alarms. If a loss is detected, the lost requests may be reinserted to the scheduler module with new reset timestamps and reassigned in step 907. The scheduler now knows which neighbors have the packet and generates a new timestamp for it. The timestamp may depend on the rarity, urgency, and/or random elements. While rarity has not changed, the packet has become more urgent. Thereafter, the queue assigner inserts the request in some of the queues 611.

A scheduler module also may react when a link is lost or its quality decreases. If a link is lost, all requests in the assignment queue of the link need to be reinserted. If there is a decrement in quality, i.e., rate drop, the assignment queue may be checked and requests possibly may be moved to other queues.

Under normal conditions, the total number of tentative requests in a scheduler module is small and roughly constant. However, when a new peer joins the network, it first gets large advertisements, i.e., the entire buffer map, from its neighbour peers. To avoid an enormous backlog, in accordance with one or more embodiments, a scheduler module first may determine the most suitable point to start the media stream and may begin scheduling packets only after that point. The initial advertisements may contain all the packets the neighbours have and, by looking at them, a scheduler may determine the boundaries of the jitter and swarming areas in the neighbour packet buffers. For an effective swarming, these areas may be relatively close to each other so, if some neighbour, for example, lags others a lot, it may be dropped immediately. The newcomer desires to form a swarming area, such as shown in FIG. 4, and it takes some time to get enough packets for that. To keep in pace with its neighbours, who are advancing all the time, it is better for the newcomer to avoid starting from a too early position. The most optimal starting point lies in one of the tuning parameters of an algorithm in accordance with one or more aspects of the present disclosure. A simple heuristics is to start at the middle of the swarming area of the "peloton," the average mid-point of swarming areas without taking in account the possible lone leaders that are far ahead the other neighbours.

Due to constant, incremental advertisements, each peer has up-to-date knowledge of its neighbor peer's buffer status. As such, decisions made in a scheduling algorithm may be based on up-to-date information. Furthermore, final decisions for packet scheduling may be postponed as much as possible. As advertising and scheduling is continuous, the buffer lag between peers is small, essentially in the same order of magnitude as transmission round-trip time, e.g., tens of milliseconds. As buffer lag is small, it is possible to achieve effective swarming even with a relatively small swarming area. As such, a 5-10 second buffer may be adequate. Small buffer lag and swarming area also implies short end-to-end latency.

Using continuous scheduling for data-driven approaches also solves some problems that are associated to multi-tree protocols. A protocol may react faster to changing network conditions or churn, e.g., new or leaving peers. Multi-tree protocols typically react slowly, e.g., 10 seconds after the incident, and must initiate a peer search algorithm that may take up to 30 seconds to repair a failed tree. Continuous scheduling may, in turn, react in fragments of a second. In addition, while multi-tree protocols need a discontinuous topology change, i.e., cut and attach branches in the sub-stream tree, continuous scheduling allows a continuous topology change, e.g., gradually changing the rate at which packets are requested from different neighbors.

With respect to small handheld devices, aspects of the present disclosure allow for a relatively short buffer, probably below 1 MB. For a usual streaming implementation, the data buffer may consume most of the memory. Thus, certain embodiments are likely to fit also in smaller devices.

In addition, the continuous scheduling aspects may be run in small increments so that a device CPU never needs to be occupied in scheduling for prolonged periods. Thus, certain embodiments may assist devices that have limited processing power and need to perform time-critical operations simultaneously, like playing a video.

In accordance with still other embodiments, the source node of the stream may be changed relatively quickly, i.e., within a few seconds. With periodic scheduling, changing a source node takes tens of seconds, and with multi-tree approaches, it practically means joining to a new overlay taking again tens of seconds. Aspects of the present disclosure allow for more interactive streaming or streaming from multiple sources.

In accordance with still other embodiments, the readiness of a peer may be monitored before the stream can be given to the player. This information may be used for end-user convenience as one can show a progress bar. Conventional systems spend most of the initialization time searching for other peers and their readiness cannot be estimated.

The invention is not limited to data-driven overlay approaches. These aspects may apply also to, e.g., multi-tree or mesh approaches. An algorithm may be run continuously that tries to improve the network topology and/or adjust to changing conditions.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

What is claimed is:

1. An apparatus configured to maintain a flow of packets in a media stream between the apparatus and a plurality of neighboring peers joined in a network, the apparatus comprising:
    a communication module configured to distribute data from and receive data to the apparatus;
    a packet buffer configured to store packets of data; and
    an advertisement module, operatively connected to the communication module and the packet buffer, and configured to distribute buffer content advertisements to neighboring peers in the network at least in part by:
        responsive to the apparatus receiving one or more packets in the media stream over the network via the communication module, each packet having a sequence number indicating its position in the media stream, storing each received packet at a position in a packet buffer corresponding to its sequence number, the packet buffer having near its head end a jitter area in which packets are stored without gaps between packets, and having near its tail end a swarming area in which packets are stored at a density that decreases toward the tail end of the packet buffer; and
        sending buffer content advertisements from the first peer to one or more of the neighboring peers, each buffer content advertisement identifying one or more randomly selected packets stored in the swarming area of the packet buffer.

2. The apparatus of claim 1, further comprising a neighborhood manager configured to discover and manage connections to new neighboring peers in the network;
    wherein, upon the apparatus making connection to a new neighboring peer, the advertisement module distributes an image of a buffer map identifying the packets stored in the packet buffer to the new neighboring peer;
    and wherein the buffer content advertisements identify incremental updates of content of the packet buffer relative to the image of the buffer map.

3. The apparatus of claim 1, wherein the advertisement module is configured to send the buffer content advertisements by piggybacking buffer content advertisements to data packets sent by the apparatus to neighboring peers.

4. The apparatus of claim 1, wherein the advertisement module is configured to send buffer content advertisements periodically.

5. The apparatus of claim 1, wherein the advertisement module is further configured to distribute buffer content advertisements by:
    selecting packets stored in the swarming area of the packet buffer for identifying in the buffer content advertisements according to a probability N/(N+i), where N is a constant corresponding to a size of a swarming area and i is a distance of the packet from a beginning of the swarming area.

6. The apparatus of claim 5, wherein the advertisement module is further configured to distribute buffer content advertisements by:
    selecting every $K^{th}$ packet stored in the swarming area of the packet buffer for identifying in the buffer content advertisements, where K is the number of neighboring peers in the network.

7. The apparatus of claim 1, wherein the advertisement module is further configured to distribute buffer content advertisements by:
    adding the packet sequence number of one or more of the selected packets into an advertisement list;
    wherein each buffer content advertisement comprises one or more of the packet sequence numbers in the advertisement list.

8. The apparatus of claim 7, wherein the advertisement module adds the packet sequence number of the one or more of the selected packets into one or more of a plurality of advertisement lists, each of the advertisement lists associated with a different one of the neighboring peers.

9. The apparatus of claim 1, wherein the communication module, packet buffer, and advertisement module are arranged as:
    at least one processor; and
    at least one memory configured to store computer readable instructions that, when executed by the at least one processor, cause the advertisement module to perform the storing and sending operations.

10. A computer-implemented method for advertising packets in a media stream available at a first peer to neighboring peers in a peer-to-peer network, comprising:
    receiving one or more packets in the media stream at the first peer from one or more peers in the network, each packet having a sequence number indicating its position in the media stream;
    in the first peer, storing each received packet at a position in a packet buffer corresponding to its sequence number, the packet buffer having near its head end a jitter area in which packets are stored without gaps between packets, and having near its tail end a swarming area in which packets are stored at a density that decreases toward the tail end of the packet buffer; and sending buffer content advertisements from the first peer to one or more of the neighboring peers, each buffer content advertisement identifying one or more randomly selected packets stored in the swarming area of the packet buffer.

11. The method of claim 10, further comprising:

sending, from the first peer to a neighboring peer, an image of a buffer map identifying packets stored in the packet buffer of the computing device;

wherein the buffer content advertisements identify incremental updates of content of the packet buffer relative to the image of the buffer map.

12. The method of claim 11, further comprising:

at the first peer, discovering new neighboring peers in the network;

wherein the step of sending the image of the buffer map is performed responsive to the first peer making connection to a new neighboring peer.

13. The method of claim 10, wherein the step of sending buffer content advertisements comprises:

upon sending a data packet to a neighboring peer, piggybacking a buffer content advertisement to the data packet.

14. The method of claim 10, wherein the step of sending buffer content advertisements is performed periodically.

15. The method of claim 10, further comprising:

selecting packets stored in the swarming area of the packet buffer for identifying in the buffer content advertisements according to a probability $N/(N+i)$, where N is a constant corresponding to a size of a swarming area and i is a distance of the packet from a beginning of the swarming area.

16. The method of claim 10, further comprising:

selecting every $K^{th}$ packet stored in the swarming area of the packet buffer for identifying in the buffer content advertisements, where K is the number of neighboring peers in the network.

17. The method of claim 10, further comprising:

adding the packet sequence number of one or more of the selected packets into an advertisement list;

wherein each buffer content advertisement comprises one or more of the packet sequence numbers in the advertisement list.

18. The method of claim 17, wherein the adding step adds the packet sequence number of the one or more of the selected packets into one or more of a plurality of advertisement lists, each of the advertisement lists associated with a different one of the neighboring peers.

19. The method of claim 18, further comprising:

receiving an acknowledgement from a neighboring peer of the receipt of a buffer content advertisement; and responsive to receiving an acknowledgement, discarding the packet sequence numbers identified in the buffer content advertisement from the advertisement list.

* * * * *